United States Patent [19]

Hiruma et al.

[11] Patent Number: 4,624,650
[45] Date of Patent: Nov. 25, 1986

[54] TORSIONAL VIBRATION ABSORBER DEVICE

[75] Inventors: Masao Hiruma; Hiroshi Nakayama, both of Saitama; Michio Suzuki, Tokyo, all of Japan

[73] Assignee: Honda Giken Kogyo Kabushiki Kaisha, Tokyo, Japan

[21] Appl. No.: 757,754

[22] Filed: Jul. 22, 1985

Related U.S. Application Data

[60] Continuation of Ser. No. 572,611, Jan. 23, 1984, abandoned, which is a division of Ser. No. 326,746, Dec. 2, 1981, abandoned.

[30] Foreign Application Priority Data

Dec. 8, 1980 [JP] Japan .................. 55-172062
Dec. 8, 1980 [JP] Japan .................. 55-172063

[51] Int. Cl.⁴ ............................................. F16D 3/14
[52] U.S. Cl. ........................ 464/26; 192/70.12; 192/93 A; 464/38; 464/46
[58] Field of Search ............... 74/411, 359; 192/70.12, 192/70.23, 93 A, 113 B; 464/24, 26, 27, 38, 39, 45, 46, 47, 48

[56] References Cited

U.S. PATENT DOCUMENTS

| | | | |
|---|---|---|---|
| 2,560,427 | 7/1951 | Foss | 464/38 |
| 2,872,794 | 2/1959 | Slomer | 464/27 |
| 3,038,576 | 6/1962 | Simpson | 464/48 X |
| 3,064,455 | 11/1962 | Gros | 464/46 X |
| 3,351,169 | 11/1967 | McIndoe | 192/113 B X |
| 3,511,349 | 5/1970 | Herscovici | 464/26 X |
| 4,275,607 | 6/1981 | Snoy | 192/113 B X |

FOREIGN PATENT DOCUMENTS

| | | | |
|---|---|---|---|
| 738514 | 7/1943 | Fed. Rep. of Germany | 192/70.23 |
| 1144067 | 2/1963 | Fed. Rep. of Germany | 464/26 |
| 544856 | 4/1942 | United Kingdom | 464/38 |
| 730422 | 5/1955 | United Kingdom | 192/113 B |
| 900849 | 7/1962 | United Kingdom | |

*Primary Examiner*—Stuart S. Levy
*Assistant Examiner*—Daniel P. Stodola
*Attorney, Agent, or Firm*—Lyon & Lyon

[57] ABSTRACT

A torsional vibration absorber device is positioned between two relatively rotatable members. A coupling member has a projection engaging a camming surface on one of the members, the camming surface being slanted circumferentially with respect to the axial direction. A wet type friction clutch is interposed between the coupling member and the other rotary member and is urged in the direction of its engagement upon axial movement of said coupling member, and a spring opposes such movement of the coupling member. A hydraulic oil chamber connected to atmosphere via an orifice decreases in volume upon axial movement of the coupling member.

4 Claims, 8 Drawing Figures

TORSIONAL VIBRATION ABSORBER DEVICE

This application is a continuation of application Ser. No. 572,611, filed Jan. 23, 1984, now abandoned, which is a division of application Ser. No. 326,746, filed Dec. 2, 1981, now abandoned.

This invention relates to a torsional vibration absorber and is particularly directed to a device of this type for use in an automotive transmission.

In a vehicle having an engine installed in front to drive the front wheels, torque is transmitted from the engine through a service clutch and through a change speed transmission, a differential gear, and drive shafts leading to the front wheels. When sudden acceleration, deceleration or sudden engagement of the service clutch takes place, the driving torque can suddenly change to cause objectionable vibration in the vehicle body. In the front wheel drive vehicle, the limitation of length of the drive shafts, the front wheel operation combining steerage and drive, and the counter-force directly transmitted from the front wheels all combine to produce objectionable torsional vibrations.

It is an object of the present invention to reduce the torsional vibration between driving and driven members.

It is a further object of this invention to dampen the torsional vibration of a shaft of the change speed transmission by employing a cam device which increases the force applied to engage a friction plate clutch, in accordance with the degree of increase of input torque.

In accordance with this invention, a torsional vibration absorber device is provided between a first rotary member and a second rotary member, and includes an intermediate coupling member connecting the first and second rotary members to each other through a multi-plate friction clutch of the wet type. The coupling member has a projection which engages a camming surface on the first rotary member slanted circumferentially with respect to the axial direction so that upon increase in the transmission torque, the coupling member turns with respect to the first rotary member and moves axially to clamp the friction clutch plates together against the action of a spring.

Other and more detailed objects and advantages will appear hereinafter.

Figure 1:
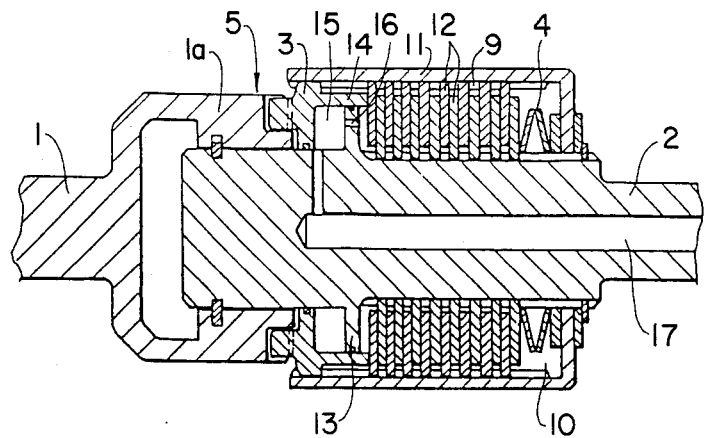
FIG. 1 is a sectional elevation showing a preferred embodiment of this invention.
Figure 2:
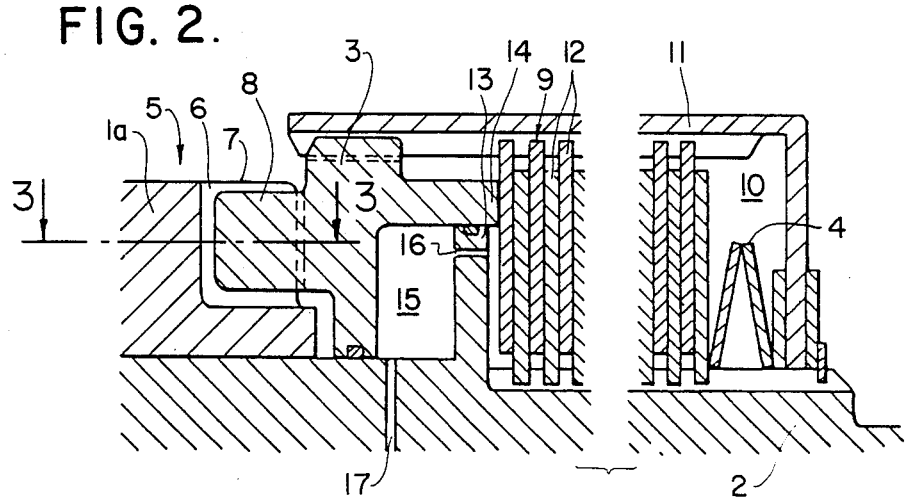
FIG. 2 is a sectional view similar to FIG. 1 as shown on a larger scale and partly broken away.
Figure 3:
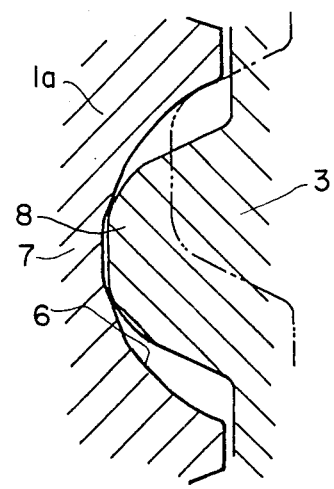
FIG. 3 is a sectional detail taken substantially on the lines 3—3 as shown on FIG. 2.

Referring to the drawings, the first rotary member 1 comprises an input shaft and the second rotary member 2 comprises an output shaft, the shafts being arranged in axial alignment. An annular coupling member 3 and a cylindrical shaft portion 1a forming a rear end of the first rotary member 1 and located forwardly of the coupling member 3 are loosely fitted on a front end portion of the second rotary member 2. The coupling member 3 is urged toward the cylindrical shaft portion 1a on the front side via friction plates 12, by means of a Belleville spring 4 located rearwardly of the friction plates 12. The engaging means 5 which drives the coupling member 3 from the cylindrical shaft portion 1a is comprised of a cam 7 formed on the cylindrical shaft portion 1a and having a camming surface 6 slanted circumferentially with respect to the axial direction as clearly shown in FIG. 3, and a projection 8 formed on the coupling member 3 and arranged in engagement with the camming surface 6. With this construction, when there occurs a change in the torque transmitted from the first rotary member 1 to the coupling member 3, there occurs a corresponding change in the axial urging force of the member 1, which acts upon the coupling member 3. For instance, when the transmission torque increases, the coupling member 3 is moved rearward against the force of the spring 4 while turning relative to the first rotary member 1.

The friction clutch 9 is interposed between the coupling member 3 having a shoulder thereon to axially abut the clutch and the second rotary member 2 also having a shoulder thereon to axially abut the clutch. The friction clutch 9 is comprised of an outer casing 11 enclosing a rear end portion of the second rotary member and defining a clutch chamber 10 between itself and the second rotary member 2, and a plurality of the aforementioned friction plates 12 accommodated within the clutch chamber 10. The outer casing 11 has a forward extension disposed in spline-engagement with the outer periphery of the coupling member 3. The coupling member 3 has its rear end formed with an annular axial protuberance 14 loosely fitted over a flange 13 formed on the second rotary member 2 which forms a partition wall at the front end of the clutch chamber 10. The protuberance 14 is disposed to urge the friction plates 12 in the direction of engagement of the clutch as the coupling member 3 is moved rearward. Further defined within a gap between the coupling member 3 and the flange 13 is an hydraulic oil chamber 15 which communicates with the clutch chamber 10 through an orifice 16 which comprises a small bore formed through the flange 13. The interior of the clutch chamber 10 communicates with the atmosphere via a gap formed at the spline-engaging portion of the outer casing 11.

The friction clutch 9 is a wet type. The oil feeding passageway 17 communicates with the hydraulic oil chamber 15 formed in the second rotary member 2, through which oil is fed to the hydraulic oil chamber 15 from a pump or another pressure source.

Referring to the operation of the device described above, as the first rotary member 1 rotates, the torque is transmitted to the second rotary member 2 by way of the coupling member 3 and the friction clutch 9. When there occurs an increase in the transmission torque, the coupling member 3 travels along the camming surface 6 and moves rearward against the force of the Belleville spring 4, while turning relative to the first rotary member 1. Due to this relative turning of the coupling member 3 and the first rotary member 1, the damping effect of the spring 4 and the damping effect caused by movement of oil through the orifice 16, which is caused by a decrease in the volume of the hydraulic oil chamber 15, abrupt or sudden torque fluctuations are damped. Further, there also occurs relative turning movement of the coupling member 3 and the second rotary member 2 caused by slippage of the friction clutch 9, which also provides a further damping effect on torque fluctuations. As the coupling member 3 is moved rearward, the engagement of the clutch 9 is strengthened to increase the torque being transmitted to the second rotary member 2. That is, a torque change characteristic is obtained as indicated by the line "A" in FIG. 7, which means that the occurrence of torsional vibrations such as those indicated by the line "B" is reduced.

If the friction clutch 9 were a dry type, it might suddenly engage when the friction plates 12 are urged by rearward movement of the coupling member 3, resulting in incomplete damping of the torque fluctuations. However, since the friction clutch 9 is of the wet type, according to the present invention, any abrupt or sudden locking or engagement of the clutch can be advantageously prevented due to the presence of oil films between adjacent friction plates 12.

Figure 7:
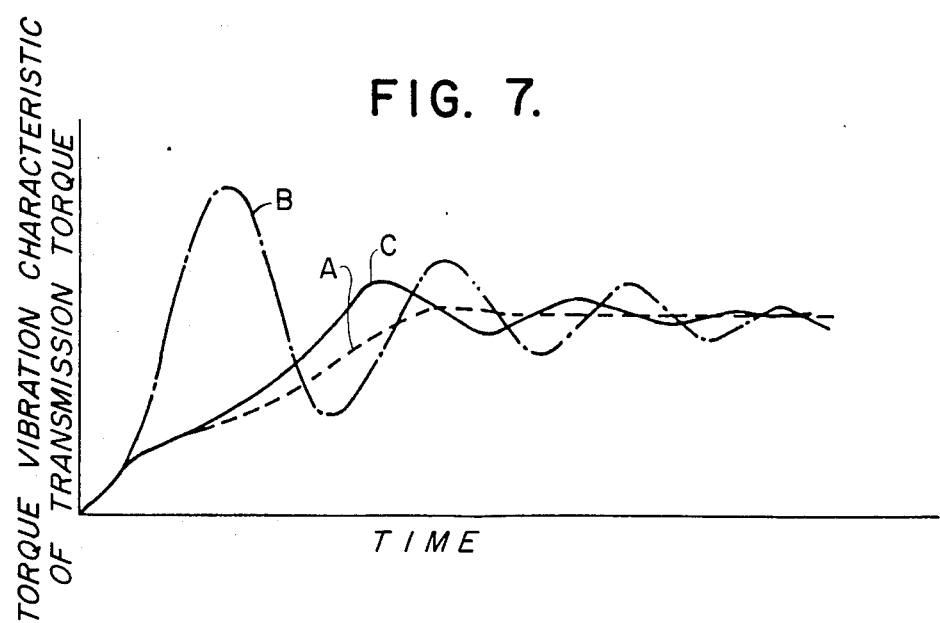
FIG. 7 is a diagram showing the relationship of the torque vibration characteristic with respect to time.

Incidentally, in FIG. 7, the line "C" represents a torque change characteristic which might be obtained when the orifice 16 is omitted so that no damping effect is available which is caused by movement of oil through the orifice 16.

Figure 4:
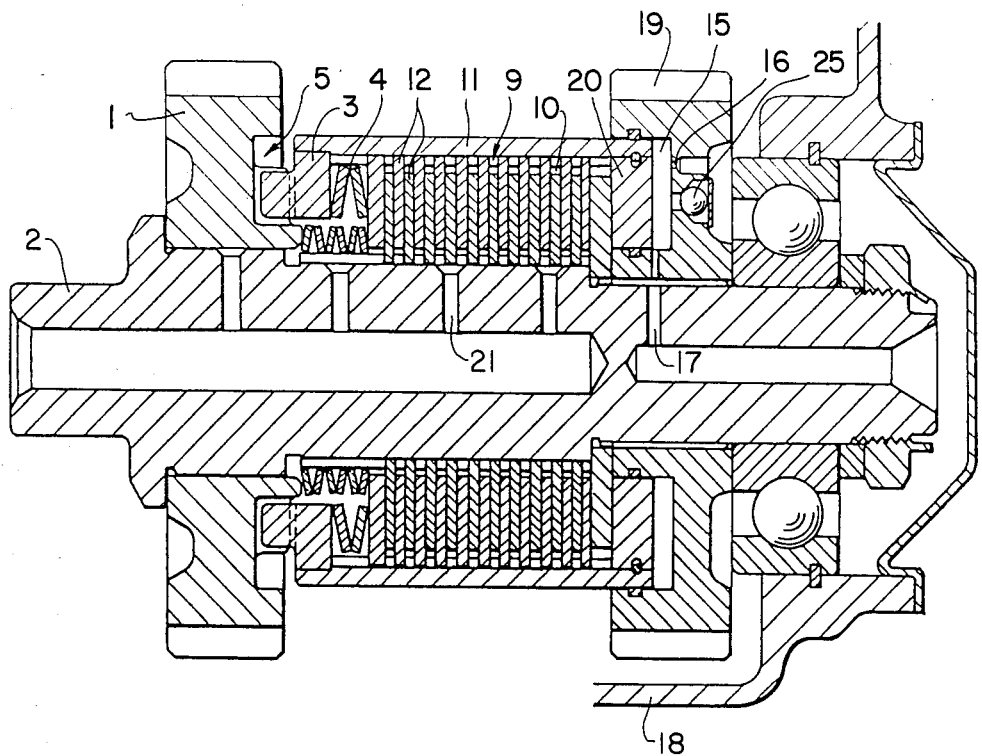
FIG. 4 is a sectional elevation showing a modification.
Figure 5:
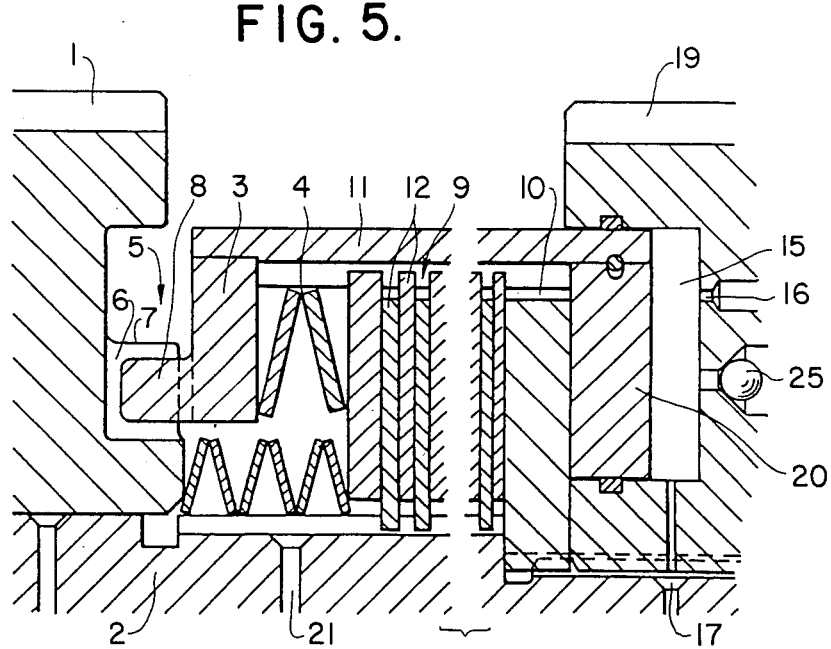
FIG. 5 is a sectional view similar to FIG. 4 as shown on an enlarged scale and partly broken away.

In the embodiment of the invention shown in FIGS. 4 and 5, a first rotary member 1 which is formed as an input gear, for instance, and a coupling member 3 are loosely fitted on a front end portion of a support shaft which comprises a second rotary member 2, and which is accommodated within a transmission casing 18. The coupling member 3 is engaged with the first rotary member 1 by means of engaging means 5 similar to one employed in the previously described embodiment. An output gear 19 is arranged in spline-engagement with a rear end portion of the support shaft 2. An outer casing 11 accommodates a friction clutch 9 which is interposed between the coupling member 3 and the second rotary member 2. The casing 11 is rigidly secured on the outer periphery of the coupling member 3 at the front end portion of the support shaft 2. Further, an annular piston 20 is rigidly secured to the inner peripheral surface of a rear end portion of the casing 11, and is inserted in a recess formed in a front face of the output gear 19 to define an hydraulic oil chamber 15 in an internal space in the recess. The chamber 15 is reduced in volume as the coupling member 3 is moved rearwardly. The hydraulic oil chamber 15 communicates directly with the atmosphere via an orifice 16 formed in the output gear 19 and a check valve 25.

A Belleville spring 4, which urges the coupling member 3 toward the first rotary member 1, is interposed between the coupling member 3 and the friction plates 12 of the friction clutch 9 so that the coupling member 3, when moving rearward, urges the clutch 9 via the spring 4 in the engaging direction.

The oil feeding passages 21 deliver oil to the clutch chamber 10 of the friction clutch 9, which passages are immersed in an oil reservoir formed in the transmission casing 18, as is another oil feeding passage 17 associated with the hydraulic oil chamber 15.

The device of this embodiment operates in substantially the same manner as that according to the preceding embodiment, and provides a torque change characteristic as indicated by the line "A" in FIG. 7.

Figure 6:
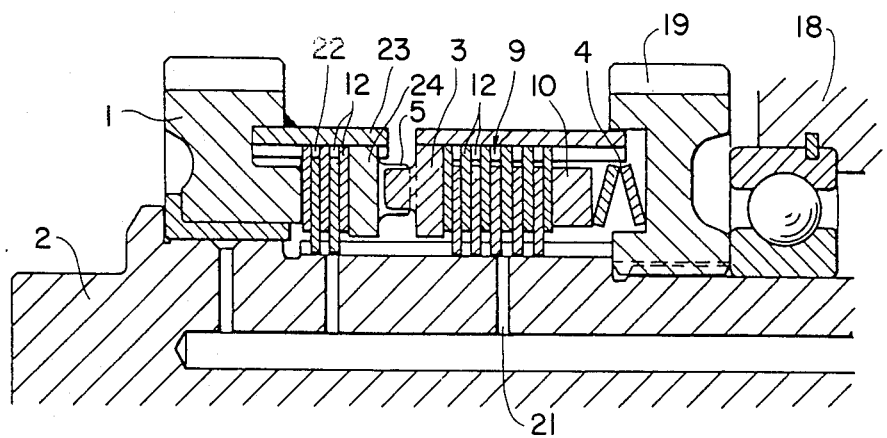
FIG. 6 is a sectional elevation showing a second modification.

FIG. 6 illustrates one embodiment according to a second aspect of the invention. This embodiment is distinguished from the preceding embodiment shown in FIGS. 4 and 5 in that a second friction clutch 22 is interposed between the first rotary member 1 and the second rotary member 2, in parallel with the connection between the coupling member 3 and the friction clutch 9. More specifically, the clutch 22 is interposed between an outer casing 23 secured to the rear end face of the first rotary member 1 and the second rotary member 2. A second coupling member 24 is arranged in spline-engagement with the inner peripheral surface of the rear end portion of the outer casing 23. At this second coupling member 24, the first rotary member 1 and the coupling member 3 are engaged with each other by means of engaging means 5 similar to the one previously described.

According to this embodiment, the hydraulic oil chamber 15 as used in the previous embodiments is omitted, and instead a Belleville spring 4 is interposed between the first friction clutch 9 and the output gear 19.

The operation of this embodiment is as follows: Part of the torque transmitted from the first rotary member 1 is transmitted to the second rotary member 2 via the second friction clutch 22, which is accompanied by a decrease in the torque transmitted via the coupling member 3 and the first friction clutch 9 by an amount corresponding to the above partial torque, resulting in a decrease in the axial urging force acting upon the coupling member 3 via the camming surface 6. Therefore, the coupling member 3 can move slowly to provide a feeling of smoothness.

Incidentally, the coupling member 3 is moved forward by the force of the spring 4 to cause self-vibrations once it has been moved backward against the force of the same spring. On this occasion, the second friction clutch 22 acts to brake the relative turning movement of the first and second rotary members 1, 2 which is caused by the forward movement of the coupling member 3 via the camming surface 6, to effectively attenuate the above self-vibrations.

As set forth above, according to the invention, the interposition of the friction clutch between the coupling member and the second rotary member enables limitless relative turning of the first and second rotary members by virtue of slippage of the clutch, even if the range of angle of relative turning of the first rotary member and the coupling member is limited by the axial stroke of the coupling member, thus resulting in positive absorption of large torque fluctuations. Further, when the transmission torque increases, the clutch is urged by the coupling member moving axially due to the increased torque, to have its engaging force increased, thus preventing a decrease in the transmission efficiency. This also permits construction of the torque absorber compact in size while large in capacity. Moreover, according to the second aspect of the invention, the movement of the coupling member is slowed to achieve a smooth vibration absorbing action.

Figure 8:
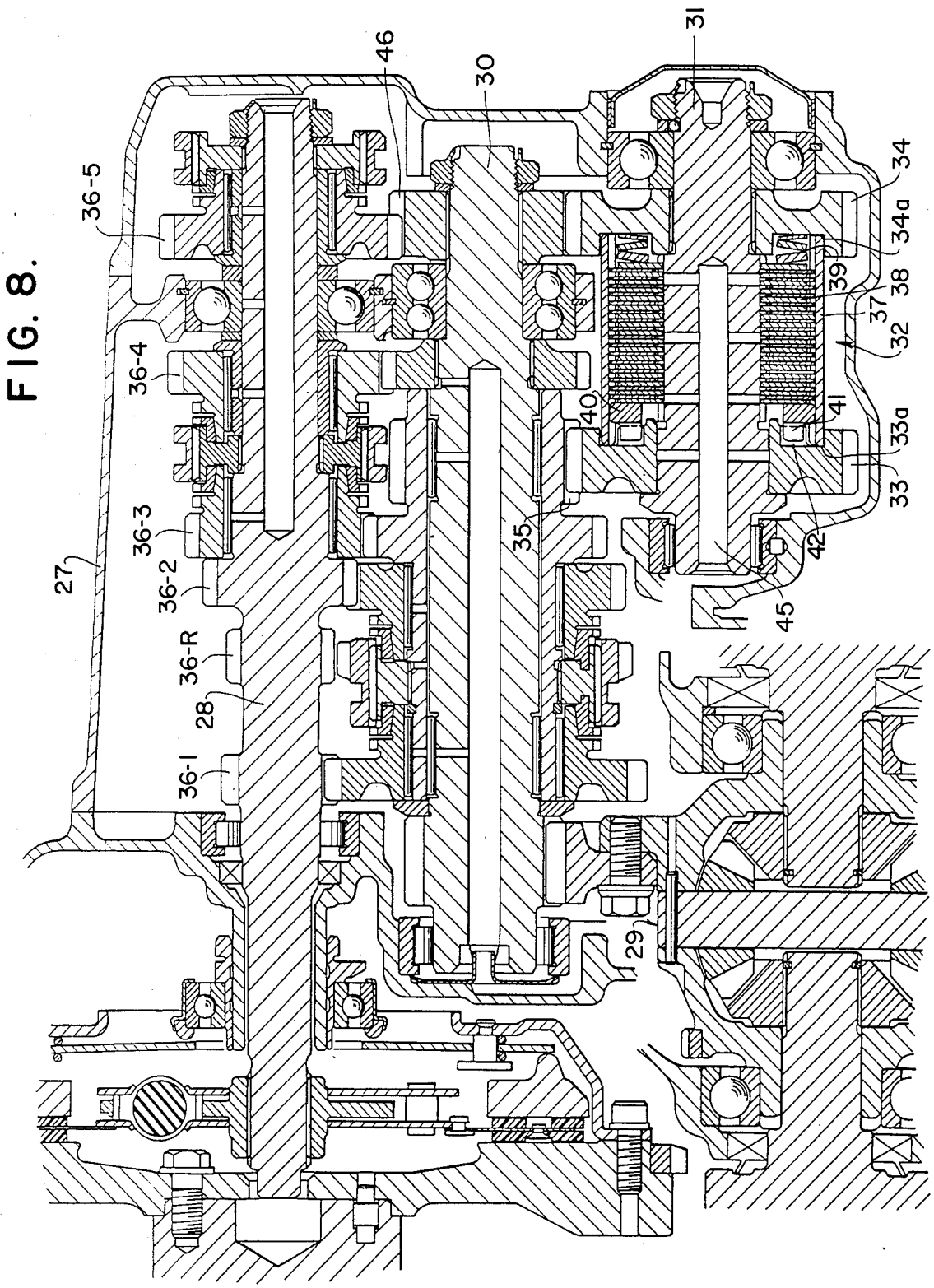
FIG. 8 is a sectional elevation showing a third modification.

The modified form of the invention shown in FIG. 8 has a torsional vibration absorber which is compact in size so as to be accommodated within a limited space and yet which is capable of fully absorbing large fluctuations in the transmission torque between the engine service clutch and wheel driveshafts.

Mounted to rotate within the transmission casing 27 are an input shaft 28 connected to an engine, an output shaft 30 connected to a differential gear 29, and an intermediate shaft 31 extending parallel with the shafts 28 and 30. A torsional vibration absorber 32 is supported on the intermediate shaft 31. The absorber 32 is coupled to the input shaft 28 via an input gear 33, and to the output shaft 30 via an output gear 34, both the gears being fitted on the intermediate shaft 31.

More specifically, the input gear 33 meshes with an idle gear 35 fitted on the output shaft 30 and the idle gear 35 is coupled to the input shaft 28 via a low gear train which is comprised of first, second and third driving gears 36-1, 36-2, 36-3 and a reverse driving gear 36-R. Thus, the absorber 32 can be engaged with the input shaft 28 only during engagement of the low gear train 36-1, 36-2, 36-3 and the reverse driving gear 36-R which are liable to produce torque fluctuations. The output gear 34 meshes with a gear 46 fixed to the output shaft 30 and engaging a high or fifth driving gear 36-5. This arrangement permits omission of an exclusive coupling gear on the output shaft 30 and thus makes the device compact in size. Also the idle gear 35 may be arranged on the input shaft 28. Reference numeral 36-4 designates a fourth driving gear.

Referring to the absorber device, the input gear 33 is disposed on a front end of the intermediate shaft 31 for rotation relative thereto, while the output gear 34 is secured on a rear end thereof for rotation therewith. Further provided are a cylindrical member 37 which is interposed between the two gears 33, 34, and loose with respect to these gears.

A friction clutch 38 forms the outer periphery of the absorber and connects the cylinder member 37 to the intermediate shaft 31. A coupling member 40 is interposed between the friction clutch 38 and the input gear 33. The coupling member 40 is prevented from rotating relative to the cylinder member 37 by means of a spline joint. The coupling member 40 is urged toward the input gear 33 by means of a spring 39, and has a projection 41 which engages a camming surface 42 on the input gear 33. The camming surface 42 is circumferentially slanted with respect to the axis of the intermediate shaft 31.

Further, according to the torque absorber device, when there occurs a change in the torque transmitted from the input gear 33, there also occurs a corresponding change in the axial urging force which acts upon the coupling member 40 via the camming surface 42. For instance, when the torque increases, the coupling member 40 is moved rearward against the force of the spring 39 while turning relative to the input gear 33 so that this relative turning of the coupling member 40 and the damping effect caused by the spring 39 absorb sudden or abrupt fluctuations in the torque. Further, there occurs relative turning movement between the coupling member 40 and the intermediate shaft 31 due to slippage of the friction clutch 38, which also brings about a damping effect for absorption of the torque fluctuations. During the rearward movement, the coupling member 40 urges the clutch 38 to increase its engaging force, resulting in a corresponding increase in the torque being transmitted to the intermediate shaft 31. Thus, the torque can be transmitted to the output shaft 30 via the output gear 34 with no substantial torsional vibration.

The torque absorber may employ the conventional arrangement wherein the torque is transmitted directly from the coupling member 40 to the output gear 34 with omission of the friction clutch 38. However, the use of the friction clutch 38 is advantageous since it enables the absorber device to be compact in size without sacrificing its capacity, because of the damping effect of the clutch 38 per se. Further, the friction clutch 38 is a wet type being supplied with oil stored within the transmission casing 27 by way of an oil feeding passageway 45, which can effectively prevent abrupt engagement of the clutch 38. Moreover, in the illustrated embodiment the cylindrical member 37 has its opposite ends fitted in grooves 33a, 34a formed in oppositely facing surfaces of the input and output gears 33, 34, in a manner supported by the gears which enables the absorber to be short in its axial direction, also leading to desirable compactness.

Having fully described our invention, it is to be understood that we are not to be limited to the details herein set forth but that our invention is of the full scope of the appended claims.

We claim:

1. A tortional vibrational absorbed comprising
a shaft;
a rotary input member rotatably mounted relative to said shaft about said shaft;
a rotary output member fixed to said shaft;
a case rotatably mounted relative to said shaft about said shaft;
a friction clutch mounted about said shaft within said case and including friction plates, at least one of said friction plates being fixed to rotate with said shaft and at least one other of said friction plates being fixed to rotate with said case;
engagement means for driving said case with said rotary input member, said engagement means including a first cam on said rotary input member extending axially and a second cam fixed to said case and extending axially to driveably engage said first cam, said first and second cams constructed to move axially upon relative rotational camming movement therebetween to increase the torque transmitting capacity of said friction clutch by providing an incrased axial clamping compression of said friction plates;
a first shoulder on said engagement means axially abutting one end of said friction clutch;
a second shoulder about said shaft, fixed axially thereto and axially engaging the other end of said friction clutch; and
a spring, said spring being disposed between said engagement means and said friction clutch for initially providing axially clamping compression on said friction plates to provide an initial torque transmitting capacity between said input member and said output member.

2. The tortional vibration absorber of claim 1 wherein said clutch is of the wet type including an oil film between said friction plates.

3. A tortional vibrational absorber comprising
a shaft;
a rotary input member rotatably mounted relative to said shaft about said shaft;
a rotary output member fixed to said shaft;
a case rotatably mounted relative to said shaft about said shaft;
a friction clutch mounted about said shaft within said case and including friction plates, at least one of said friction plates being fixed to rotate with said shaft and at least one other of said friction plates being fixed to rotate with said case;
engagement means for driving said case with said rotary input member, said engagement means including a first cam on said rotary input member extending axially and a second cam fixed to said case and extending axially to driveably engage said first cam, said first and second cams constructed to move axially upon relative rotational camming movement therebetween to increase the torque transmitting capacity of said friction clutch by providing an increased axial clamping compression of said friction plates;

a first shoulder on said engagement means axially abutting one end of said friction clutch;

a second shoulder about said shaft, fixed axially thereto and axially engaging the other end of said friction clutch;

a spring, said spring being disposed between said engagement means and said friction clutch for initially providing axially clamping compression on said friction plates to provide an initial torque transmitting capacity between said input member and said output member; and a hydraulic oil chamber arranged between said case and said output member to change volume upon axial movement of said case, said hydraulic oil chamber communicating with atmosphere via an orifice.

4. The torsional vibration absorber of claim 3 wherein said clutch is of the wet type including an oil film between said friction plates.

* * * * *

UNITED STATES PATENT AND TRADEMARK OFFICE
CERTIFICATE OF CORRECTION

PATENT NO. : 4,624,650
DATED : November 25, 1986
INVENTOR(S) : MASAO HIRUMA; HIROSHI NAKAYAMA & MICHIO SUZUKI It is certified that error appears in the above-identified patent and that said Letters Patent are hereby corrected as shown below:

In column 6, line 13, delete "absorbed" and insert therefor -- absorber --.

Signed and Sealed this

Thirty-first Day of March, 1987

Attest:

DONALD J. QUIGG

Attesting Officer

Commissioner of Patents and Trademarks